G. W. BURNHART.
FLUID PRESSURE MOTOR.
APPLICATION FILED APR. 21, 1913.

1,142,551.

Patented June 8, 1915.

Witnesses
Frank R Glen

Inventor
G. W. Burnhart

UNITED STATES PATENT OFFICE.

GEORGE W. BURNHART, OF DENVER, COLORADO.

FLUID-PRESSURE MOTOR.

1,142,551.  Specification of Letters Patent.  Patented June 8, 1915.

Application filed April 21, 1913. Serial No. 762,450.

*To all whom it may concern:*

Be it known that I, GEORGE W. BURNHART, a citizen of the United States, residing at Denver, in the county of Denver and State of Colorado, have invented certain new and useful Improvements in Fluid-Pressure Motors, of which the following is a specification.

This invention relates to fluid pressure motors and my object is to provide a motor adapted for various duties and for use in connection with compressed air, gas, steam or other fluids under pressure.

More particularly the invention contemplates a piston cylinder form of engine in which various peculiar and novel features of piston and valve construction are involved to be hereinafter referred to, and a special feature will be noted as residing in an arrangement of valve and valve-tripping means whereby the stroke of the piston may be regulated.

With these general objects in view my invention comprises details of construction as hereinafter described and claimed and in order to afford a complete understanding of the same, reference will be made to the accompanying drawing in which—

Figure 1:
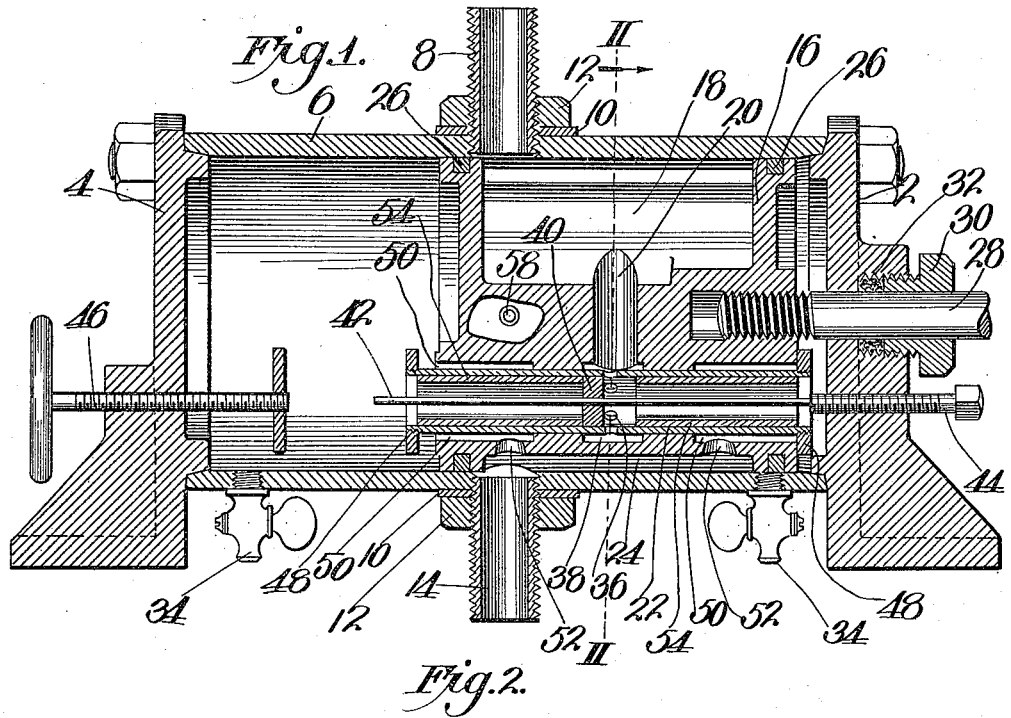
Figure 2:
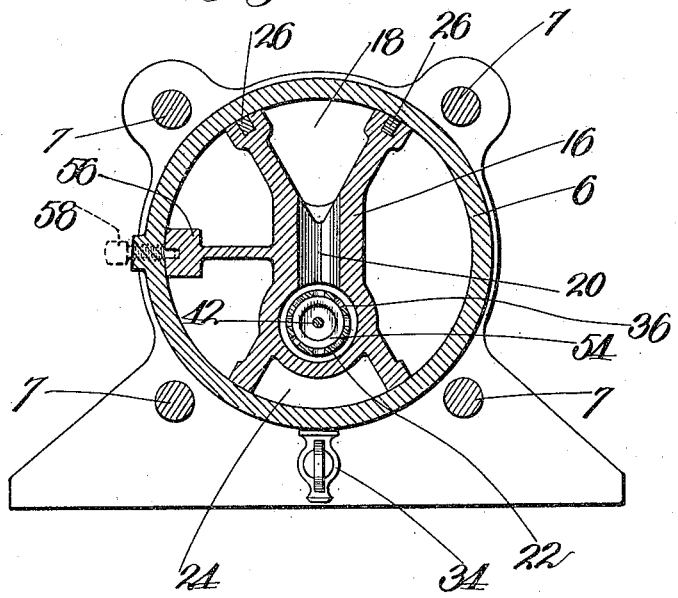

Figure 1, is a vertical longitudinal section through my device, and Fig. 2, is a vertical transverse section along the line II—II of Fig. 1, looking in the direction of the arrow.

In the drawing the cylinder comprising my motor is provided with cylinder heads 2 and 4 clamped to the cylinder body casing 6, by means of tie bolts 7. For supplying fluid pressure to the cylinder 6, an inlet opening to the latter is provided through a threaded pipe 8, the connection with the cylinder being sealed by packing 10 secured tightly in place by a nut 12. Opposite the inlet opening is provided an outlet opening through pipe 14, the same tight connection being made by a nut 12 and packing 10.

Sliding within the cylinder 6, is a piston 16, which is approximately X-shape in cross section as shown in Fig. 2. The upper half of the piston is provided with a receiving pocket 18 in communication with the inlet opening through pipe 8 and also communicating through a passage 20 with the valve tube 22 slidingly carried within the lower half of the piston, which lower half is also provided with a discharge pocket 24 in communication with the outlet opening through the pipe 14. The said pockets 18 and 24 are shut off from communication with the rest of the cylinder at their ends by the heads of the piston and the parts of the piston in contact with the cylinder are fitted with packings 26. The piston rod 28 is tapped for engagement with the body of the piston between the pockets 18 and 24 and slides through the head 2, this passageway being made tight by a collar 30 and packing 32. The cylinder may be drained when necessary through the pet-cocks 34 provided in connection with the casing 6. The valve tube 22 is provided with a series of inlet ports 36, formed through its middle portion for communication with the pocket 38 provided in the piston at the lower end of the passage 20. These ports also have communication alternately with opposite ends of the cylinder through the opposite ends of the tube 22, and in order to shut off communication alternately with the opposite ends of said tube, a valve disk 40 slides back and forth through the middle of the tube past the ports. The disk is operated by a rod 42 connected thereto and extending entirely through the tube and designed to abut alternately at its opposite ends against two adjustable stops 44 and 46 threaded respectively through the cylinder heads 2 and 4, and in alinement with said rod. To each end of the tube 22 is threaded a ring 48 for closing the discharge ports 50 formed as annular passages about the ends of the tube and through the adjacent portions of piston 16, and communicating through openings 52 with the discharge pocket 24. Rings 48 are operated to close and open the ports 50 by the movement of the tube 22 at the end of each stroke of the piston, the tube being moved not only with the piston but relatively thereto by the disk 40, which is forced against the inner ends of sleeves 54 secured within the tube 22.

In Fig. 1 of the drawing, the piston is shown as having been forced to the right end of the cylinder, during which stroke the valve disk 40 was at the right of the ports 36 and the right hand port 50 was open so that the air or other fluid within the right hand end of the cylinder was forced out through the corresponding opening 52 and outlet 14. But just as the piston was reaching the end of said stroke the rod 42 met the stop 44 forcing the disk 40 and in turn the tube 22 into the position shown and consequently closing the right hand port 50, in which position they are ready for the return stroke of the piston. The fluid enters the ports 36 and passes through the valve tube to the space behind the right hand end of the piston, it being noted that the opposite discharge port 50 is now open preparatory to the movement of the piston into that end of the cylinder to force its fluid contents through said port to the pipe 14. As the piston moves to the left under the force of the pressure applied to its right hand end, the rod 42 comes into contact with the stop 46 so that the continued movement of the piston closes the ports 36 by their being brought over the valve disk 40, and after the ports 36 have been closed, the piston moves slightly farther due to the momentum it has gathered accompanied by the expansion of the fluid that is behind the piston. This last movement of the piston opens the ports 36 on the other side of the valve disk 40 and the sleeve 54 meets the disk 40 whereby the valve tube 22 is drawn to the right through the piston thus closing the left hand port 50 and opening the right hand port. The parts are now put in position for the fluid to enter at the left of the piston, the next movement of which will be toward the opposite end of the cylinder from which it will force the fluid that has been used through the corresponding port 50, repeating the operations thus described. In order to obviate any tendency of the piston to rotate within the cylinder and to maintain the alinement of the rod 42 with its stops 44 and 46, I provide the middle portion of the piston with a guiding extension 56, the outer end of which is forked to form a guideway for engagement with the guiding stud 58, which latter may be in the form of a set screw passed through the side of the cylinder casing 6, represented in dotted lines in Fig. 2, and shown in full lines in the broken away portion of the piston in Fig. 1.

This fluid pressure motor, will be found adapted to many uses, for example, for pumps in pumping water or the like, or for air compressors, etc., one special use being connection with ore concentrators and slimers, for operating the reciprocating ore tables as illustrated in my co-pending application No. 756385, filed March 24, 1913, where it is particularly desirable to employ a driving means which is not subject to any rebounding action. Since in the applicant's motor the fluid always has access to one end of the piston or the other, and the ports are instantly shifted at the end of each stroke, the piston is reversed without any rebound. Furthermore because of this continuous access of fluid to one or the other end of the piston, the latter has no dead-center position, but may be started from any position which it may happen to occupy, and, as already indicated, the stroke of the piston may be adjusted by simply regulating the position of the stops for the valve rod.

While I have illustrated one desired form which my invention is adapted to take, it is obvious that various changes will suggest themselves to one skilled in the art, and I reserve the right to such changes as will properly fall within the scope of the appended claim.

I claim:—

A fluid pressure cylinder having inlet and exhaust openings at opposite sides, an X-shaped piston within the cylinder having a receiving pocket between its upper arms, in communication with the inlet opening, a passage extending downwardly from said pocket, a circular chamber at the lower end of the passage, an exhaust pocket below the said circular chamber, in communication with the exhaust opening, a pair of end ports and a pair of exhaust openings connecting said end ports with the exhaust pocket, a piston rod connected to the piston and extending through one of the heads or ends of the cylinder, and a guiding means to prevent rotation of the piston, a valve tube extending slidingly through the piston and projecting beyond the ends thereof and also extending centrally through said circular chamber and said end ports and provided centrally with one or more perforations always in communication with the said circular chamber, external rings mounted on the extremities of the tube for alternately closing communication between the said end ports and the cylinder at opposite ends of the piston, a pair of short tubes secured to and within the perforated tube and terminating in planes at opposite sides of the perforated portion of said first-named tube, a valve fitting in the perforated tube between the short tubes and adapted to slide from one side of the perforation or perforations to the other, and a stem secured to said valve and adapted through encountering resistance alternately offered by the heads of the cylinder under travel of the piston, to slide said valve from one side of said perforation or perforations to the other and cause said valve by alternately pressing on the inner ends of said short tubes to slide the first-named tube in opposite directions alternately until its rings alternately engage the ends of the piston to close the adjacent end ports.

In testimony whereof, I affix my signature in the presence of two witnesses,

GEORGE W. BURNHART.

Witnesses:
BERNARD J. FORD,
ANNA E. WELSH.

Copies of this patent may be obtained for five cents each, by addressing the "Commissioner of Patents, Washington, D. C."